(12) United States Patent
Keshmiri et al.

(10) Patent No.: US 10,754,337 B2
(45) Date of Patent: Aug. 25, 2020

(54) SYSTEMS AND METHODS FOR PLANNING PATHS TO GUIDE ROBOTS

(71) Applicant: Hypertherm, Inc., Hanover, NH (US)

(72) Inventors: Mohammad Keshmiri, Quebec (CA); Chahe Bakmazjian, Quebec (CA); Waseem Khan, Quebec (CA)

(73) Assignee: Hypertherm, Inc., Hanover, NH (US)

( * ) Notice: Subject to any disclaimer, the term of this patent is extended or adjusted under 35 U.S.C. 154(b) by 258 days.

(21) Appl. No.: 15/627,730

(22) Filed: Jun. 20, 2017

(65) Prior Publication Data
US 2017/0364076 A1 Dec. 21, 2017

Related U.S. Application Data

(60) Provisional application No. 62/352,384, filed on Jun. 20, 2016.

(51) Int. Cl.
*G05B 19/41* (2006.01)
*G05D 1/00* (2006.01)
*B25J 9/16* (2006.01)
*G05B 19/042* (2006.01)
*G05D 1/02* (2020.01)

(52) U.S. Cl.
CPC .......... *G05D 1/0088* (2013.01); *B25J 9/1664* (2013.01); *G05B 19/042* (2013.01);
(Continued)

(58) Field of Classification Search
CPC .. B25J 9/1664; G05B 19/042; G05B 19/0426; G05B 19/41; G05B 2219/34142;
(Continued)

(56) References Cited

U.S. PATENT DOCUMENTS 6,757,613 B2 6/2004 Chapman et al.
8,914,152 B2 12/2014 Scheurer et al.
(Continued)

FOREIGN PATENT DOCUMENTS

DE 10 2005 060 967 A1 6/2007

OTHER PUBLICATIONS

Connors, J., et al., "Manipulating B-Spline Based Paths for Obstacle Avoidance in Autonomous Ground Vehicles," ION NTM 2007, Jan. 22-24, 2007, San Diego, CA, 8 pages.
(Continued)

*Primary Examiner* — Dale Moyer
(74) *Attorney, Agent, or Firm* — Proskauer Rose LLP

(57) ABSTRACT

A computer-implemented method is provided for guiding a robot in a robotic system, by creating a refined path, based on an initial path in a three-dimensional space. The method includes receiving data related to creating the initial path, including a start point and an endpoint, and generating the initial path by interpolating the start point and the endpoint. The method also includes receiving inputs for at least one support point that defines a coordinate in the three-dimensional space for altering the initial path, and adjusting the initial path to generate the refined path by modifying a set of one or more polynomial functions, such that the refined path interpolates the at least one support point between the start point and the endpoint. The method further includes providing the refined path to a second computing module for guiding the robot.

35 Claims, 11 Drawing Sheets
(8 of 11 Drawing Sheet(s) Filed in Color)

(52) U.S. Cl.
CPC ......... *G05B 19/0426* (2013.01); *G05B 19/41* (2013.01); *G05D 1/02* (2013.01); *G05B 2219/34142* (2013.01); *G05B 2219/36458* (2013.01); *G05D 1/0227* (2013.01)

(58) Field of Classification Search
CPC ...... G05B 2219/36458; G05B 19/4103; G05B 19/42; G05B 2219/34135; G05B 2219/40519; G05B 2219/34145; G05B 2219/34153; G05B 2219/34157; G05B 2219/34089; G05B 19/42207; G05B 2219/34167; G05B 2219/34171; G05D 1/0088; G05D 1/02; G05D 1/0227
See application file for complete search history.

(56) References Cited

U.S. PATENT DOCUMENTS

| | | | |
|---|---|---|---|
| 9,221,175 B2 | 12/2015 | Iwasaki | |
| 2004/0158356 A1* | 8/2004 | Webb | B25J 9/1623 700/250 |
| 2005/0052460 A1 | 3/2005 | Davignon | |
| 2005/0071021 A1* | 3/2005 | Weinhofer | B25J 9/1664 700/63 |
| 2016/0346853 A1* | 12/2016 | Tuboguchi | B23H 1/02 |
| 2018/0299874 A1* | 10/2018 | Nobuhara | B25J 9/163 |
| 2019/0240833 A1* | 8/2019 | Kimura | B25J 9/0081 |

OTHER PUBLICATIONS

Piazzi, A., et al., "G3-Splines for the Path Planning of Wheeled Mobile Robots," 2003 European Control Conference (ECC), Sep. 1-4, 2003, Cambridge, UK, 6 pages.

Quinlan, S., et al., "Elastic Bands: Connecting Path Planning and Control," Robotics Laboratory, Computer Science Department, Stanford University, 1993, 6 pages.

Severa, O., et al., "New 3D HMI tool for robot path planning based on latest W3C standards," Department of Cybernetics, University of West Bohemia in Pilsen, Pilsen, Czech Republic, 2012 6 pages.

* cited by examiner

SYSTEMS AND METHODS FOR PLANNING PATHS TO GUIDE ROBOTS

CROSS REFERENCE TO RELATED APPLICATION

This application claims the benefit of and priority to U.S. Provisional Patent Application No. 62/352,384, filed Jun. 20, 2016, which is owned by the assignee of the instant application and incorporated herein by reference in its entirety.

TECHNICAL FIELD

The present invention generally relates to computer-implemented methods and apparatuses for automatic paths generation to guide robots in a robotic system.

BACKGROUND

Robotic path planning is used in a variety of industries to improve throughput. For example, in a manufacturing processing facility, a robotic system can be used to automate processing (e.g., heating, cutting, gouging and marking) of workpieces by one or more thermal processing torches (e.g., plasma arc torches). Specifically, the manufacturing facility can include a computer numeric controller (CNC) used by an operator to input information specifying various operating parameters. The CNC can be in electrical communication with one or more robots of the manufacturing processing facility, where at least one robot can have a thermal processing torch mounted thereon for automatically processing a workpiece. In operation, a user can supply inputs to the CNC to program the robot, such that the robot moves the thermal processing torch along a planned path to process the workpiece. This type of path planning can be used to create a transition between two robotic operations or in a pick-n-place operation where processing starts at a designated location.

Robotic path planning can be used in industrial manufacturing applications, such as trimming, cutting (e.g., using laser, water-jet or plasma), 3D machining, de-burring, welding, dispensing, surfacing (e.g., polishing, sanding or grinding), spraying (e.g., thermal projection, cold spray, coating or painting) and additive applications (e.g., 3D printing or material build-up). However, robotic path planning is not limited to the manufacturing processing industry, as described above. A variety of other industries also benefit from such planning. For example, robotic path planning can be used in the medical industry for robotic assisted medical services, in the entertainment industry, in automated warehousing for sorting, assembling, picking and/or placing applications.

Generally, a robot is defined by a set of links, which are the solid structural members of the robot, and a set of joints, which are the movable couplings between the joints. In addition, a tool center point (TCP) can be defined in relation to the robot or a tool mounted on the robot, where the TCP refers to the robot position, as well as the focal point of the tool if it is mounted on the robot (e.g., the tip of the plasma arc torch mounted to the robot). In the context of the present invention, a "path" of a robot refers to a path for moving the TCP from a start pose to an end pose. A "pose" refers to a set of position and orientation of the robot's TCP. In addition, in the context of the present invention, a "configuration change path" refers to a path for changing the configuration of the robot, such as turning one or more joints of the robot to reach a desired end configuration. Further, "a joint-turn change path" refers to a path for turning a particular joint of the robot to reach a desired end joint-turn.

Typically, path planning for a robotic system is accomplished through either a series of rapid moves of a robot executed in a joint space or a series of feed moves of a robot executed in a Cartesian space. In particular, joint-space planning involves planning joint moves of a robot by specifying a set of joint parameters that describes the configuration of the robot. Joint-space planning does not require verification of the path for robotic errors, such as singularity errors or out-of reach errors. This type of planning naturally incorporates configuration and joint-turn changes of the robot. However, planning in joint space typically results in an unintuitive movement of the robot in the three-dimensional space. For example, in an exemplary planning process, the user simulates the joint moves of a robot between a start posture and an end posture. The user then verifies if the robot motion remains collision free. If not, the user adds a few via points between the start and end postures to avoid collision. However, it is extremely difficult to produce an accurate joint-space simulation of the robot, where the accuracy of the simulation depends on many factors, including robot parameters, robot loading and controller settings. For these reasons, joint-space planning for a transition in tight three-dimensional spaces is not feasible.

Cartesian-space planning involves planning a path of a robot by specifying a set of feed moves in the Cartesian space between a start posture and an end posture. Although suitable for tight spaces, this approach requires configuration information and verification of the path for possible robotic and collosion errors.

Generally, path planning tools in today's market are either manual planners or automated solvers. For manual planners, the user needs to create a series of transition points and meticulously ensure that the resulting path is efficient and error free (e.g., collision-free). For example, in both joint-space planning and Cartesian-space planning, the placement of via points or feed moves in a three-dimensional environment can be made through a point-by-point manual teaching technique, which requires the user to move the robot to each via point between the start and end postures and save each via point. Upon completion, the path, which is defined by the start point, the via points and the end point, is tested to make sure that it is free of robotic or collision errors. If an error exits, some or all of the saved points are modified to remove the error. This is a repetitive process that is time consuming and challenging. Automated solvers typically use some type of heuristics to drag the robot incrementally from the start point of the transition to the desired target without planning the entire path as an initial step. These automated approaches also do not allow a user to control or participate in the planning process, such as allowing the user to refine a path or perform other types of interactions. Further, in the context of manufacturing processing, these tools are typically unable to design efficient paths in complex manufacturing facilities that have numerous workpieces of varying geometries.

SUMMARY

It is therefore an objective of the present invention to provide a graphical tool that supports interactive path planning for guiding robots in a robotic system, which can be useful in a variety of applications (e.g., manufacturing processing) where space is often constrained. Using the graphical tool of the present invention, a user can quickly specify an initial path in its entirety, which provides fast visual feedback on possible errors as well as allows the user to quickly determine and specify other desired objectives for the path or for the robot itself (e.g., the robot arriving at the target location in a desired configuration). Such an automated, interactive approach to path planning reduces the effort required by a user to define a path, while still providing the user with a great degree of control over the path details. The present invention thus simplifies path generation by creating a user-interactive workflow that reduces planning time and improves path accuracy. It is also an objective of the present invention to provide systems and methods for automatically configuring a robot, such as automating joint-turn changes or configuration changes for the robot to enhance its operational capability. Therefore, advantages of the present invention include fast path planning, enabling planning for both robot position and orientation, providing fast visual feedback of potential errors on the planned path, facilitating planning for configuration and joint turn changes for the robot, and accurate and interactive control of robot positions and configurations.

In one aspect, a computer-implemented method is provided for guiding a robot in a robotic system, by creating a refined path, based on an initial path in a three-dimensional space. The method includes receiving, by a computing device, data related to creating the initial path, including a start point and an endpoint and generating, by the computing device, the initial path by interpolating the start point and the endpoint. Generating the initial path includes determining, by the computing device, a set of one or more polynomial functions to represent the initial path, where the set of one or more polynomial functions defines coordinates to model a route from the start point to the end point, and displaying, by the computing device on a graphical user interface, the initial path. The method also includes receiving, by the computing device, inputs for at least one support point that defines a coordinate in the three-dimensional space for altering the initial path. The method further includes adjusting, by the computing device, the initial path to generate the refined path by modifying the set of one or more polynomial functions, such that the refined path interpolates the at least one support point between the start point and the endpoint. In addition, the method includes providing, by the computing device, the refined path to a second computing module for guiding the robot. In some embodiments, the computing device and the second computing module are in the same robotic system.

In another aspect, a computer readable product, tangibly embodied on a non-transitory computer readable storage device, is provided for guiding a robot in a robotic system to move between a given start point and a given endpoint, by designing a refined path based on an initial path in a three-dimensional space. The computer readable product includes instructions operable to cause a computing device to receive data related to creating the initial path, including the start point and the endpoint, and generate the initial path by interpolating the start point and the endpoint. Instructions operable to cause the computing device to generate the initial path comprise instructions operable to cause the computing device to determine a set of one or more polynomial functions to represent the initial path, where the set of one or more polynomial functions define coordinates to model a route from the start point to the end point, and display the initial path on a graphical user interface. The computer readable product also includes instructions operable to cause a computing device to receive inputs for at least one support point that defines a coordinate in the three-dimensional space for altering the initial path, and adjust the initial path to generate the refined path by modifying the set of one or more polynomial functions, such that the refined path interpolates the at least one support point between the start point and the endpoint. The computer readable product further includes instructions operable to cause a computing device to provide the refined path an operating module for guiding the robot from the start point to the endpoint.

In yet another aspect, a computer-implemented robotic system is provided for guiding a robotic means in a three-dimensional space. The manufacturing processing system includes an input means for (i) receiving data related to creating an initial path, including a start point, an endpoint, and (ii) inputs for at least one support point that defines a coordinate in the three-dimensional space for altering the initial path. The system also includes a determination means for generating the initial path by interpolating the start point and the endpoint. The determination means comprises a modeling means for determining a set of one or more polynomial functions to represent the initial path, wherein the set of one or more polynomial functions define coordinates to model a route from the start point to the end point, and a display means for causing to display on a graphical user interface the initial path. The system further includes an adjusting means for adjusting the initial path to generate a refined path by modifying the set of one or more polynomial functions, such that the refined path interpolates the at least one support point between the start point and the endpoint. The system additional includes an output means for providing the refined path to a second computing module for guiding the robotic means from the start point to the endpoint.

In yet another aspect, a computer-implemented method is provided for guiding a robot having a tool mounted thereon for processing a workpiece, by creating a refined path based on an initial path in a three-dimensional space. The method includes receiving, by a computing device, data related to creating the initial path, including a start point and an endpoint, and generating, by the computing device, the initial path by interpolating the start point and the endpoint. Generating the initial path comprises determining, by the computing device, a set of one or more polynomial functions to represent the initial path, where the set of one or more polynomial functions defines coordinates to model a route from the start point to the end point, and detecting, by the computing device, a potential error associated with the initial path. Generating the initial path also comprises displaying, by the computing device on a graphical user interface, the initial path, wherein at least one section of the initial path is configured to visually indicate the potential error. The method additionally includes receiving, by the computing device, data for at least one support point that defines a coordinate in the three-dimensional space for altering the initial path, and adjusting, by the computing device, the initial path to generate the refined path by modifying the set of one or more polynomial functions, such that the refined path interpolates the at least one support point between the start point and the endpoint. The method further includes providing, by the computing device, the refined path to enable the robot and the tool to move substantially along the refined processing path to process the workpiece.

Any of the above aspects can include one or more of the following features. In some embodiments, at least one of the start point, the endpoint or the support point is user specifiable. In some embodiments, the set of one or more polynomial functions comprises at least one Bezier spline function.

In some embodiments, adjusting the initial path includes receiving user input specifying a location of the support point in three dimensional space, adding at least one new polynomial function to the set of one or more polynomial functions, such that the refined path includes the user specified support point, the start point and the endpoint, and displaying the refined path on the graphical user interface. In some embodiments, the refined path comprises a plurality of segments connected in series by the start point, the at least one support point, and the endpoint. Each segment is modeled by one polynomial function in the set of one or more polynomial functions. In some embodiments, at least one new polynomial function is added to the set of one or more polynomial functions when a new support point is added.

In some embodiments, a control handle is established for each of the start point, the endpoint and the support point. Each control handle permits a user to change curvature of at least a portion of the initial path or the refined path. In some embodiments, user input is received to manipulate the control handle associated with at least one of the start point, the endpoint or the support point. In response, the set of one or more polynomial functions is modified, such that at least a portion of the refined path has a modified curvature corresponding to the manipulated control handle, and the refined path is displayed on the graphical user interface. In some embodiments, the at least portion of the refined path with the modified curvature comprises a path portion between the corresponding point for which the control handle is adjusted and an adjacent point.

In some embodiments, a potential error associated with at least one of the initial path or the refined path is detected, and at least a portion of the corresponding initial or refined path is color coded to visually indicate the potential error. The color-coded portion of the corresponding path correlates to an area at which the potential error is likely to occur. The potential error can comprise the color-coded portion of the corresponding path being out of reach of the robot. The potential error can comprise the color-coded portion of the corresponding path causing the robot to be in a singularity configuration. The potential error can comprise the robot colliding with an object in the robotic system if the robot attempts to reach the color-coded portion of the corresponding path. In some embodiments, at least one of the initial path or the refined path is tessellated to generate a plurality of tessellated points along the corresponding initial or refined path; and each of the tessellated points along the corresponding path is checked for the potential error.

In some embodiments, (i) a potential error associated with the refined path is detected. (ii) The refined path is displayed on the graphical user interface, where at least one section of the refined path is color coded to visually indicate the potential error associated therewith. (iii) Inputs are received for at least one modification of the refined path. (iv) The refined path is then adjusted by modifying the set of one or more polynomial functions to model the modification to the refined path. Steps (i)-(iv) are repeated until no additional path modification is received. In some embodiments, adjusting the refined path comprises adding a new polynomial function to the set of one or more polynomial functions in response to receiving inputs to add a new support point between the start and end points. In some embodiments, adjusting the refined path comprises modifying the set of one or more polynomial functions, such that at least a portion of the refined path has a modified curvature in response to receiving inputs to manipulate a control handle associated with at least one of the start point, the endpoint or the support point. In some embodiments, the refined path is displayed on the graphical user interface and a user is allowed to iteratively adjust the refined path via the graphical user interface by manipulating a location of the at least one support point or a control handle of the at least one support point.

In some embodiments, the refined path enables the robot and a tool mounted on the robot to move substantially along the refined path to process a workpiece. In some embodiments, the robot is operated to enable a tool mounted thereon to cut a workpiece substantially along the refined path. In some embodiments, the tool comprises a cutting tool for cutting the workpiece. In some embodiments, the computing device learns user adjustments to the initial path to determine a pattern in the adjustments, and automatically generates a recommended path based on the learning.

In some embodiments, inputs are received specifying a start configuration and an end configuration for moving one or more joints of the robot. A difference between the start and end configurations is detected. A change path is added for moving the robotic joints from the start configuration to the end configuration based on the difference, where the change path for moving the robotic joints avoids interfering with the refined path. Automatically determining the change path can comprise automatically locating a change point between the start configuration and the end configuration. The change path is adapted to include the start configuration, the change point, and the end configuration. In some embodiments, the change path is substantially collision free.

BRIEF DESCRIPTION OF THE DRAWINGS

The patent or application file contains at least one drawing executed in color. Copies of this patent or patent application publication with color drawings will be provided by the Office upon request and payment of the necessary fee.

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
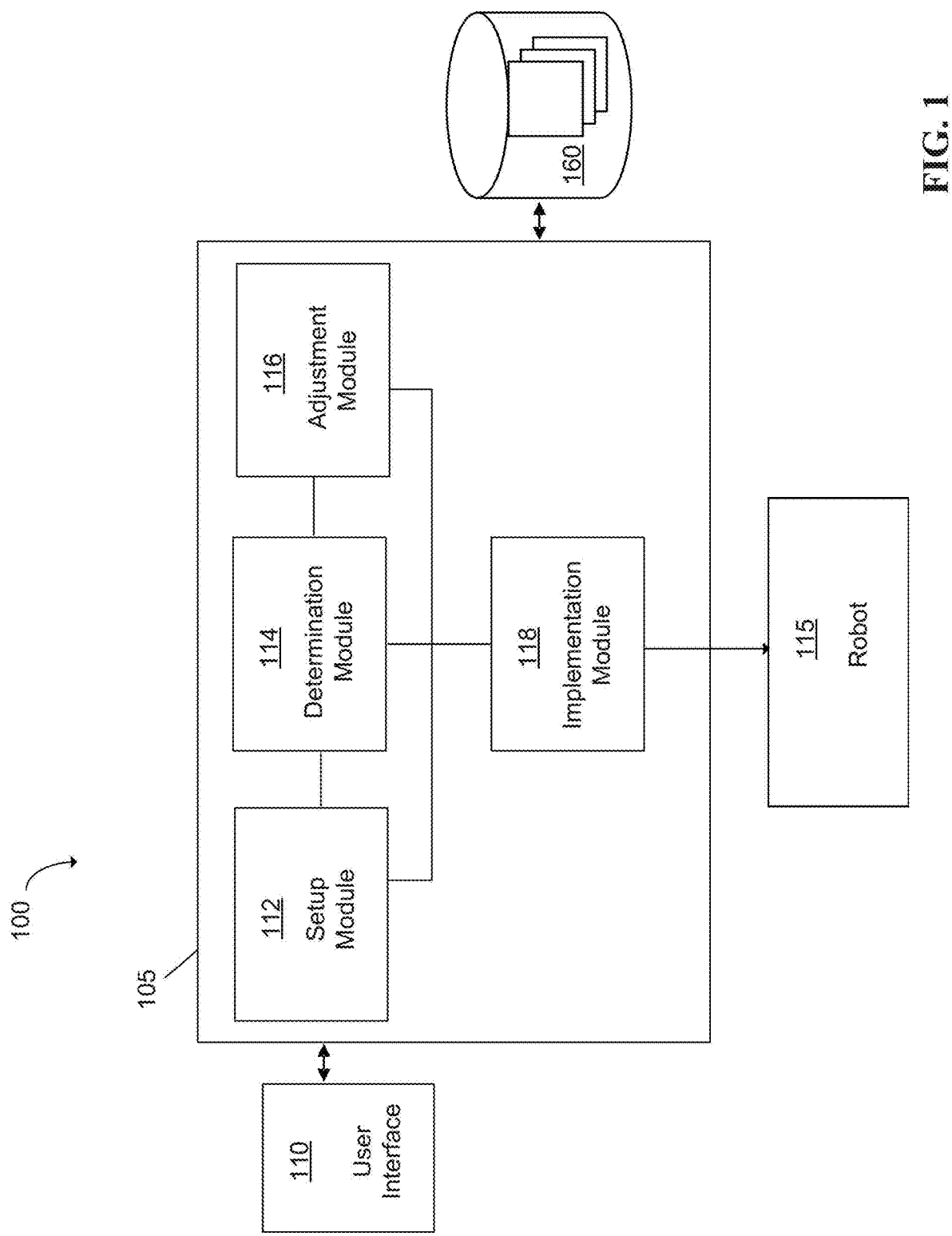
FIG. 1 is a block diagram of an exemplary robotic system, according to an illustrative embodiment of the present invention.

FIG. 1 is a block diagram of an exemplary robotic system 100 that includes a path planning processor 105, a user interface 110 and a robot 115, according to an illustrative embodiment of the present invention. The user interface 110 can include a computer keyboard, mouse, a graphical user interface (e.g., a computerized display), other haptic interfaces, voice input, or other input/output channels for a user to communicate with the path planning processor 105. In some embodiments, the graphical user interface of the user interface 110 is configured to visualize a three-dimensional virtual environment in which one or more paths generated by the processor 105 are mapped relative to various components of the manufacturing processing system 100. The path planning processor 105 is coupled to the robot 115 to automate or otherwise direct the robot 115 to follow the planned path, such as for the purpose of processing (e.g., cutting) a workpiece using a tool (e.g., a plasma arc torch) mounted on the robot 115. In some embodiments, the path planning processor 105 can also direct the robot 115 to change its configuration or one or more specific joints along a desired change path.

As shown in FIG. 1, the processor 105 includes a setup module 112, a determination module 114, an adjustment module 116 and an implementation module 118. The modules 112-118 can be implemented in hardware only or in a combination of hardware and software to execute the path generation processes described below. In particular, the setup module 112 is configured to receive and process data from a user via the user interface 110, including a start point and an endpoint for a desired path to move the TCP of the robot 115. The setup module 112 is also configured to receive inputs from the user to alter the resulting paths. In addition, the setup module 112 is configured to receive inputs from the user to specify changes to the configuration of the robot 115, such as specifying an end configuration of the robot 115 that is different from its start configuration. Further, the setup module 112 is configured to receive inputs from the user to specify changes to a particular joint of the robot 115, such as specifying an end joint coordinate of the robot 115 that is different from its start joint coordinate. In general, the data provided to the user interface 110 and/or processed by the setup module 112 can be in the form of any suitable data structures, such as textual lists, XML documents, class objects (e.g., instances of C++ or Java classes), other data structures, or any combination thereof.

The determination module 114 is configured to generate an initial path for moving the TCP of the robot 115 based on the parameters of the setup module 112. The determination module 114 is also adapted to plan a configuration change path or a joint-turn change path for changing the configuration or one or more joint turns of the robot 115, respectively, based on user inputs. The determination module 114 is further configured to interact with the graphical user interface 110 to perform at least one of: (i) visualize the initial path in a virtual environment relative to other components of the robotic system 110, such as relative to the robot 115 and/or a workpiece, (ii) visualize the configuration change path for changing the configuration of the robot 115 from a start posture to an end posture in the same virtual environment, or (iii) visualize the joint-turn change path for changing one or more joint turns of the robot 115 from a start joint coordinate to an end joint coordinate in the same virtual environment. Such a display facilitates user interaction with the processor 105 to refine the initial path and/or the configuration and joint-turn change paths.

The adjustment module 116 is configured to adjust the initial path generated by the determination module 114 based on adjustment inputs received by the user interface 110 and processed by the setup module 112. In some embodiments, the adjustment module 116 is also adapted to adjust the configuration and/or joint-turn change paths of the robot 115 based on adjustment inputs received by the user interface 110 and processed by the setup module 112. The adjustment module 116 is further configured to interact with the graphical user interface 110 to cause visualization of the adjusted paths, thus encouraging further refinement from the user. In some embodiments, visualization of an adjusted path includes indication of one or more possible errors associated with certain sections of the path.

The implementation module 118 can coordinate with the robot 115 such that the TCP of the robot 115 follows the refined path. The implementation module 118 can also manipulate the robot 115 to follow the configuration or joint-turn change path to implement changes to its configuration or joint turn, respectively. In general, the implementation module 118 can communicate with any one of the modules 112-116 to obtain the pertinent information for articulating different parts of the robot 115.

The system 100 further includes a memory 160 that is configured to communicate with one or more of the modules 112-118 of the processor 105. For example, the memory 160 can be used to store data processed by the setup module 112, one or more functions and values used by the determination module 114 to model the initial path, the configuration change path or the joint-turn change path, one or more function and values used by the adjustment module 116 to alter the various paths, and/or instructions formulated by the implementation module 120 to direct the movement of the robot 115.

Figure 2:
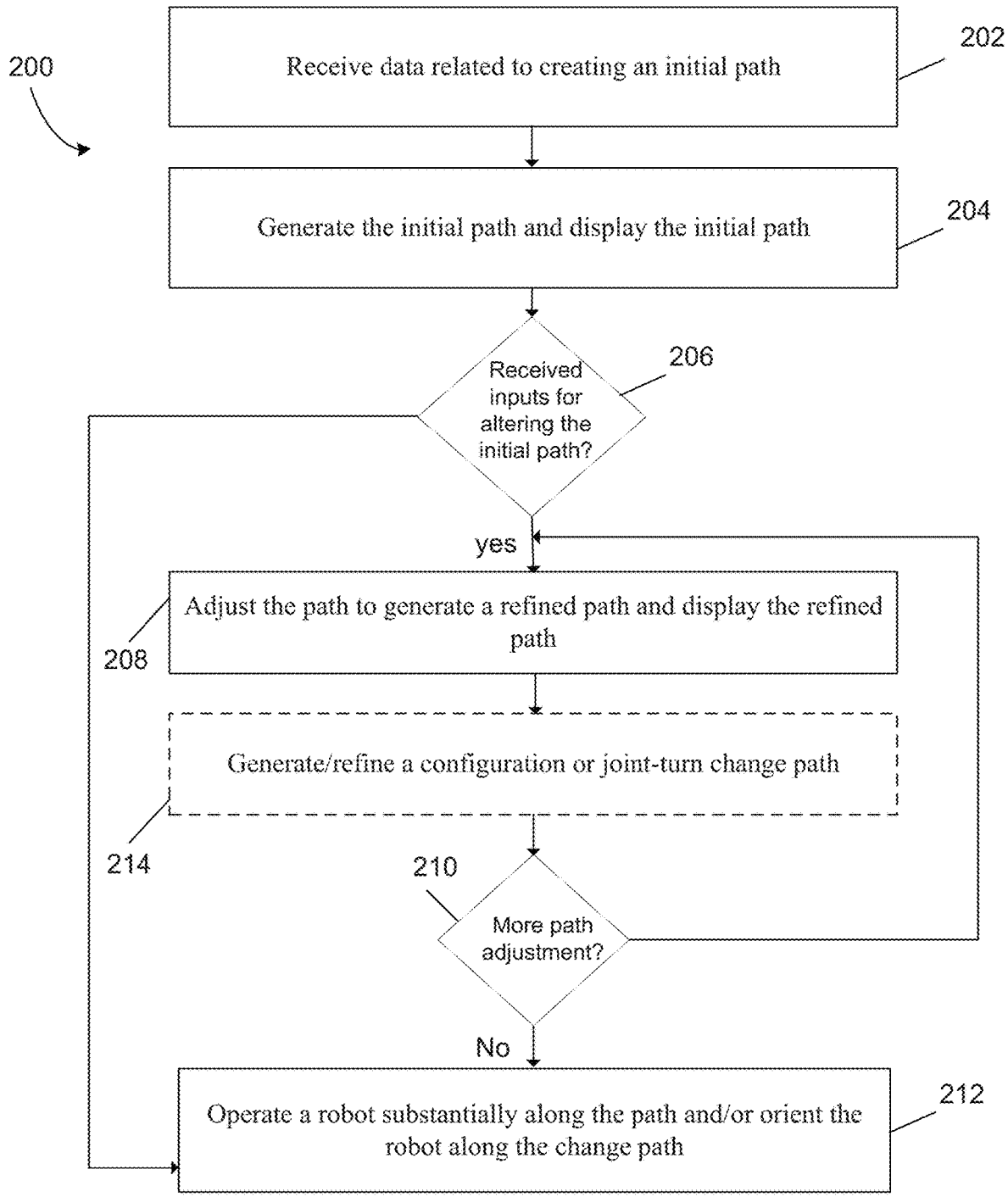
FIG. 2 is an exemplary approach for creating a desired path by a robot in the robotic system of FIG. 1, according to an illustrative embodiment of the present invention.

FIG. 2 is an exemplary approach 200 for creating a desired path for moving the robot 115 of the robotic system 100 of FIG. 1, according to an illustrative embodiment of the present invention. In the context of the present invention, a "path" refers to a planned route for moving the tool center point (TCP) of the robot 115 from a start pose to an end pose, where a "pose" refers to a set of position and orientation of the robot's TCP. As shown in FIG. 2, generating a desired path can include receiving data related to creating an initial path (step 202), generating and displaying the initial path (step 204), determining whether user inputs are received for altering the initial path (step 206), if so, adjusting the initial path based on the user-specified adjustment to generate and display a refined path (step 208), determining whether additional adjustments are received for iteratively enhancing the refined path (step 210), and operating the robot 115 substantially along the refined path if there is no additional adjustment (step 212).

Optionally, the approach 200 is also configured to create/refine a desired change path for changing a configuration or a specific joint of the robot 115 during an iteration of path refinement (step 214). In the context of the present invention, a "configuration change path" refers to a planned route for changing the configuration of the robot 115, such as turning one more joints of the robot to reach a desired end posture. Further, "a joint-turn change path" refers to a planned route for turning a particular joint of the robot to reach a desired joint end coordinate. The change path can be used to suitably orient the robot 115 (step 212).

At step 202, the setup module 112 of the processor 105 can process the data for creating an initial path for moving the TCP of the robot 115, where the data is received from a user via the user interface 110. The data can include a start point and an endpoint of the path in a three-dimensional space. In some embodiments, the user can specify the start and end points graphically via the user interface 110 within a three-dimensional virtual space.

At step 204, the determination module 114 is configured to generate the initial path based on the data received at step 202, where the initial path interpolates the start and end points. In some embodiments, the determination module 114 uses at least one (e.g., exactly one) three-dimensional polynomial function to represent the initial path as a three-dimensional spline, where the polynomial function defines a set of three-dimensional coordinates to model a route from the start point to the endpoint. Generally, this spline can be based on any suitable polynomial function(s). For example, a single cubic Bezier spline function with G2 (position and tangent) continuity can be used to represent the initial spline path, where the Bezier spline function can be decomposed into the following X, Y and Z components:

$$B_x = (1-t)^3 P_{0x} + 3(1-t)^2 t P_{1x} + 3(1-t) t^2 P_{2x} + t^3 P_{3x}$$ Equation 1

$$B_y = (1-t)^3 P_{0y} + 3(1-t)^2 t P_{1y} + 3(1-t) t^2 P_{2y} + t^3 P_{3y}$$ Equation 2

$$B_z = (1-t)^3 P_{0z} + 3(1-t)^2 t P_{1z} + 3(1-t) t^2 P_{2z} + t^3 P_{3z}$$ Equation 3

Figure 3:
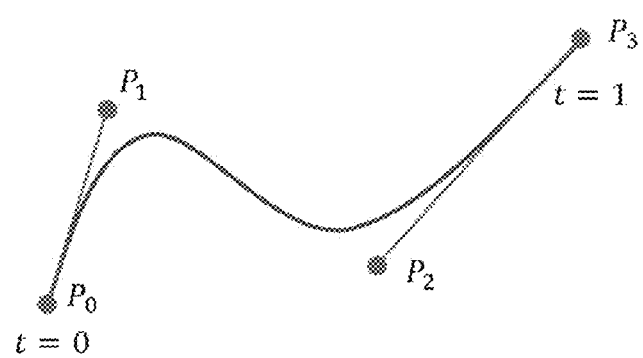
FIG. 3 illustrates an exemplary path modeled as a Bezier curve, according to an illustrative embodiment of the present invention.

In Equations 1-3, $B_x$, $B_y$ and $B_z$ represent X, Y and Z coordinates of a Bezier curve at each instant of parameter t, where t is adapted to change from 0 to 1. $P_0$ and $P_3$ represent the start and end points of the Bezier curve. $P_1$ and $P_2$ represent control handles of the Bezier curve at the start and end points, respectively. In some embodiments, the control handles $P_1$ and $P_2$ are user adjustable to enable the user to change the shape of the Bezier curve between the start and end points $P_0$ and $P_3$, such as changing the curvature and/or the tangent of the curve. FIG. 3 illustrates an exemplary path (e.g., an initial path) modeled as a Bezier curve, according to an illustrative embodiment of the present invention.

Figure 4:
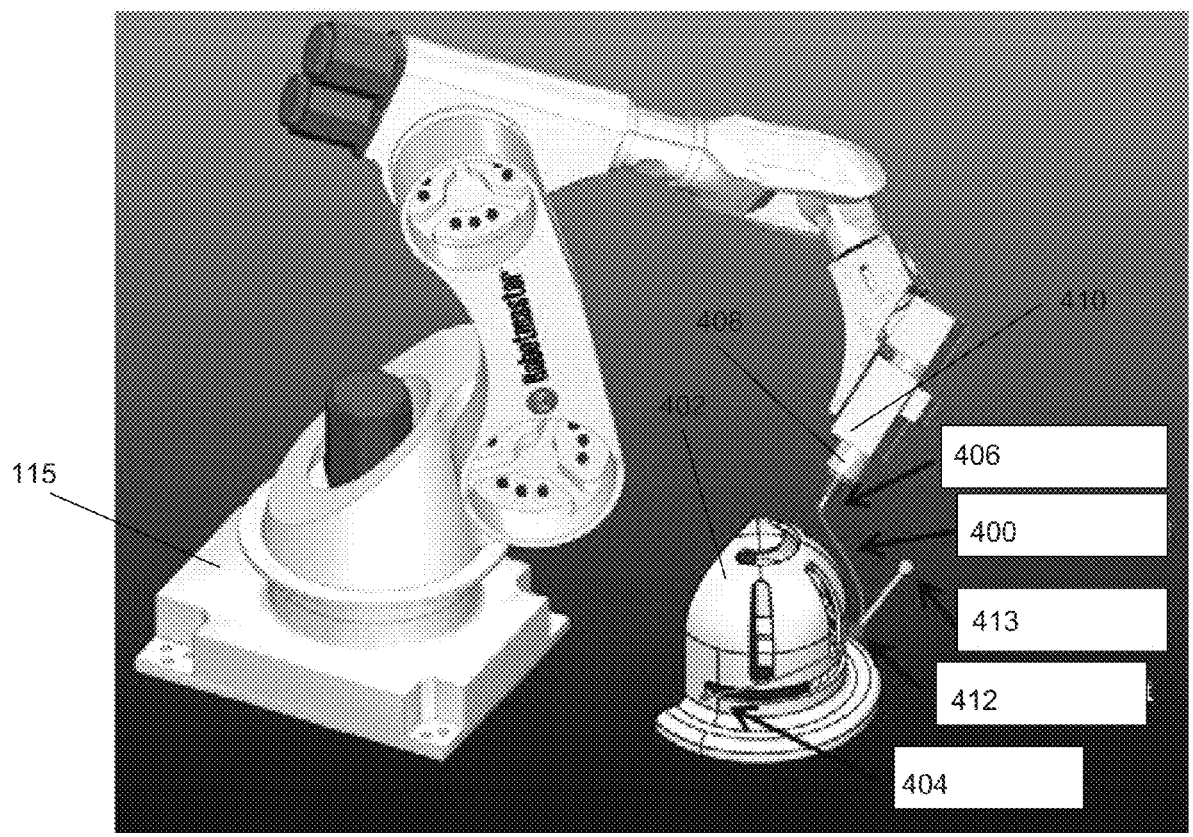
FIG. 4 is a three-dimensional virtual environment in which an exemplary path is displayed, according to one illustrative embodiment of the present invention.

In some embodiments, the determination module 114 can interact with the user interface 110 to display the initial path in a three-dimensional virtual environment. FIG. 4 shows a three-dimensional virtual environment in which an exemplary path, e.g., an initial path 400, is displayed, according to one illustrative embodiment of the present invention. As shown, the virtual environment depicts the robot 115, a workpiece 402, and the initial path 400, which is generated by the determination module 114 at step 204 to guide the robot 115 to process the workpiece 402. The initial path 400 includes the user-specified start point 404, the user-specified end point 406, and a computer-generated curve that connects these two points, where the curve can be defined by a three-dimensional Bezier spline function, as described above. In some embodiments, an end effector 410 of the robot 115 has a processing tool 408, such as a plasma arc torch, mounted thereon for processing (e.g., cutting) the workpiece 402 along the path 400.

Figure 5:
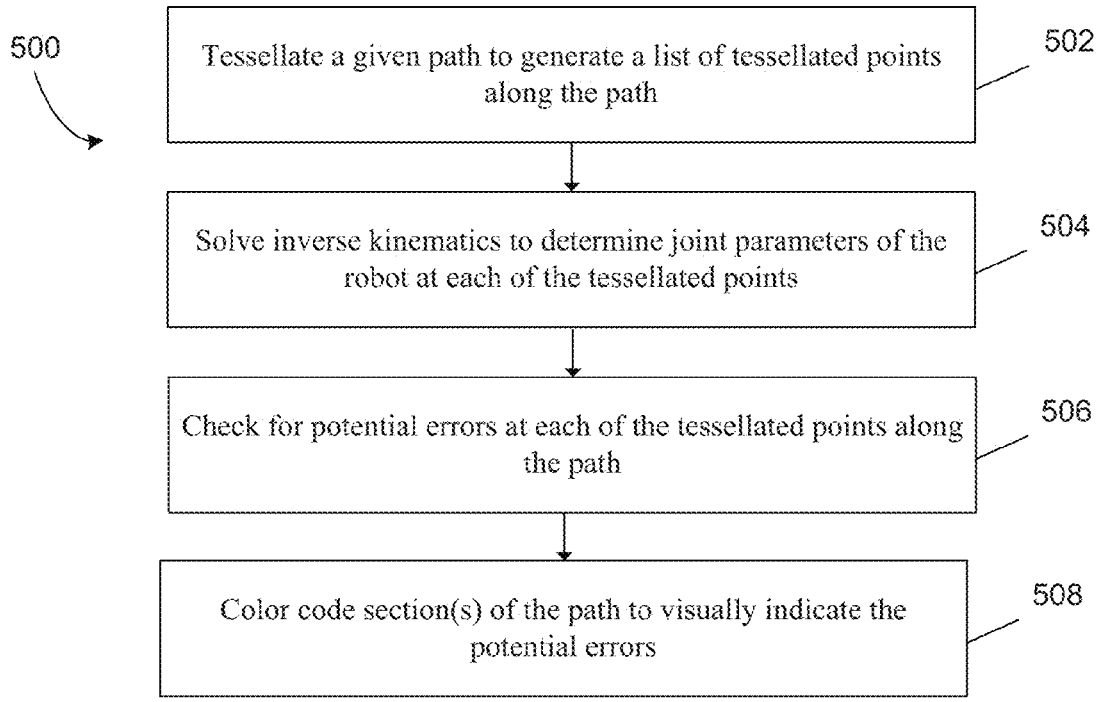
FIG. 5 is an exemplary approach for determining and illustrating errors associated with a path for moving the robot of the robotic system of FIG. 1, according to an illustrative embodiment of the present invention.
Figure 6A:
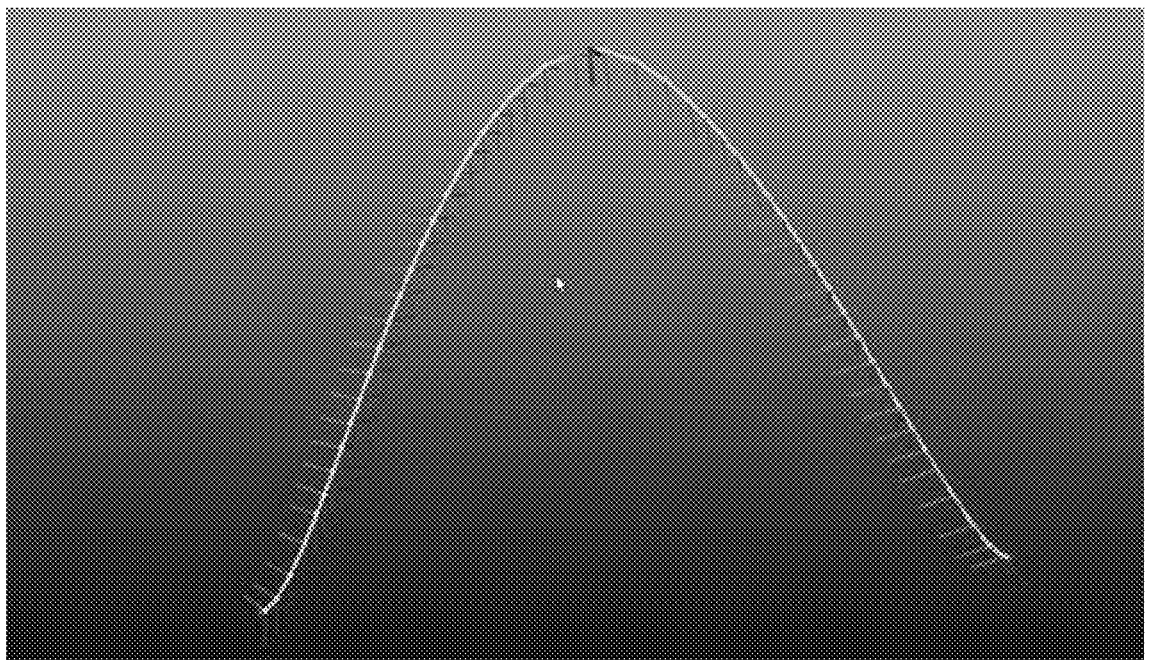
FIGS. 6a and 6b illustrate fine and course tessellations, respectively, of an exemplary curved path, according to illustrative embodiments of the present invention.
Figure 6B:
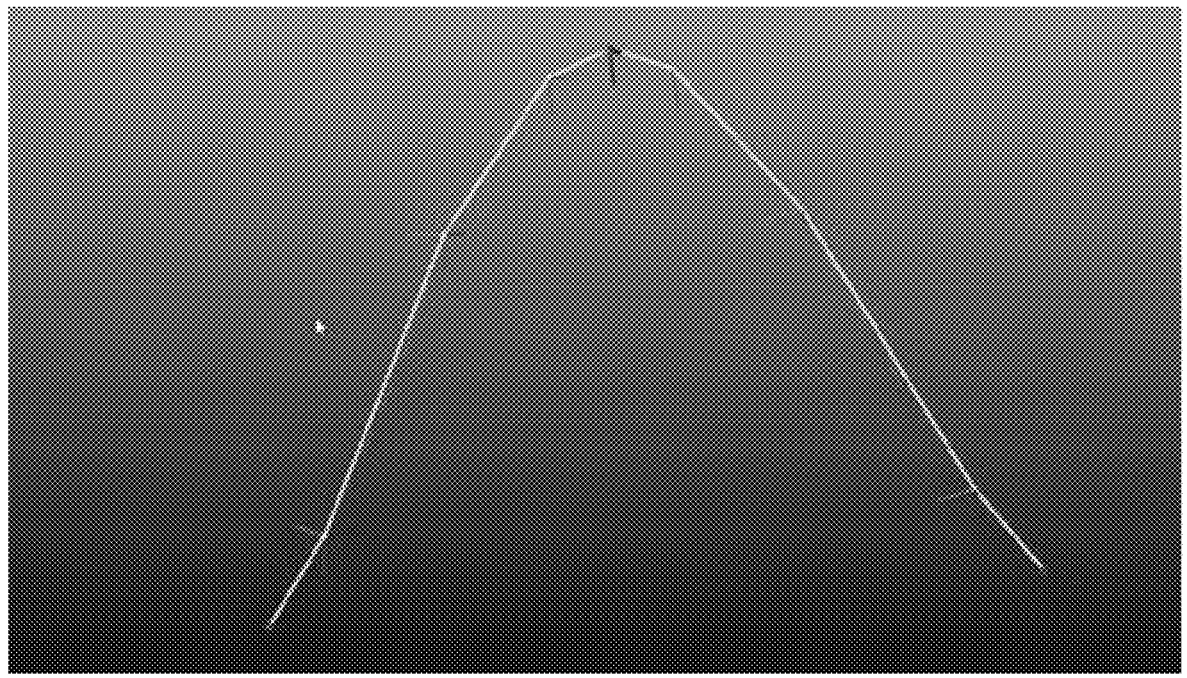

In some embodiments, displaying the initial path at step 204 also includes visually illustrating one or more errors associated with this path. FIG. 5 is an exemplary approach 500 for determining and illustrating errors associated with a given path for moving the robot 115 of the robotic system 100 of FIG. 1, according to an illustrative embodiment of the present invention. At step 502, for a given path, the determination module 114 tessellates the path to return a list of tessellated points. Tessellating a path, such as a Bezier curve, involves determining a plurality of spaced points on the path which can be used to approximate the original Bezier curve if straight lines are used to connect these points. In some embodiments, closeness between a Bezier curve and a line created by two neighboring tessellated points on the curve are defined by three parameters: (i) a chordal deviation between the line and the Bezier curve, (ii) a length of the line and (iii) an angle between two consecutive lines. In some embodiments, thresholds for one or more of the chordal deviation, the length of a line between each pair of adjacent tessellated point, and the angle between two consecutive lines are user specified. Thus, the lower the threshold value for each parameter, the finer the tessellation and the greater the number of tessellated points generated. FIGS. 6a and 6b illustrate fine and course tessellations, respectively, of an exemplary curved path, according to illustrative embodiments of the present invention.

At step 504, the determination module 114 solves inverse kinematics based on one or more kinematics equations to determine the joint parameters of the robot 115 in order to reach each of the tessellated points on the given path from step 502. At step 506, the determination module 114 uses the joint parameters corresponding to each tessellated point to check for one or more potential errors associated with that point. One potential error comprises the tessellated point on the given path being out of reach by the robot 115. Another potential error comprises the tessellated point on the given path causing the robot 115 to be in a singularity posture, such as when the robot loses its ability to move its end effector 410 (shown in FIG. 4) in some direction no matter how it moves its joints or when the robot has infinite joint posture possibilities to reach the next Cartesian posture. Yet, another potential error comprises the robot 115 colliding with another object of the robotic system if the robot 115 attempts to reach the tessellated point, such as colliding with the workpiece 402 of FIG. 4 or another adjacent object (not shown).

Figure 7:
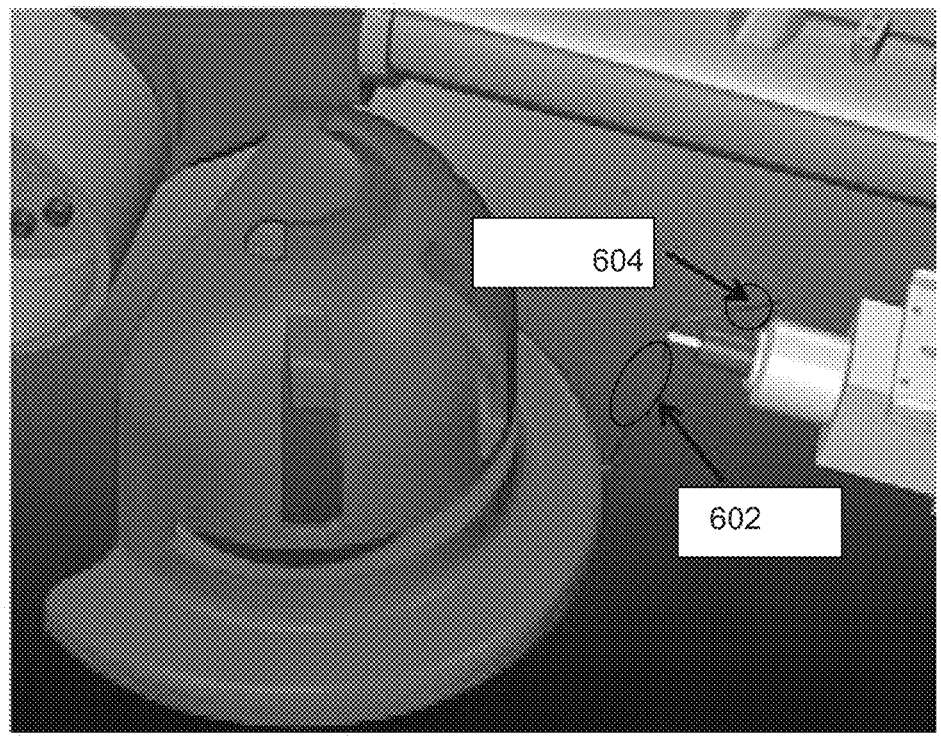
FIG. 7 is an exemplary path that is color coded to indicate potential errors, according to an illustrative embodiment of the present invention.

At step 508, the determination module 114 can color code one or more sections of a given path to visually indicate the potential errors detected from step 506. Specifically, for the tessellated points that are associated with a certain type of error (e.g., singularity, collision and/or out-of-reach), the points are displayed in a specific color, along with segments of the path connecting these points. For example, an affected path segment associated with (i) a singularity error can be coded red, (ii) a collision error can be coded dark red and (iii) an out-of-reach error can be coded blue. In some embodiments, another color (e.g., white) can be assigned to points and their interconnecting path segments that are error free. Such color-coded path display provides visual feedback to the user regarding the planned path and allows the user to quickly adjust the path to remove the errors, as explained below. FIG. 7 is an exemplary path that is color coded to indicate potential errors, according to an illustrative embodiment of the present invention. As shown, the dark red path section 602 indicates a potential collision error, where it is determined that the robot 115 is likely to collide with another object if the robot 115 attempts to reach that path section 602. In addition, the blue path section 604 of the same path indicates a potential out-of-reach error, where the robot 115 is unlikely to be able to reach that path section 604.

Referring back to the path-generation approach 200 of FIG. 2, as described above, at step 204 the determination module 114 is adapted to generate an initial path and display the initial path to the user via the user interface 110, where the initial path can be color coded to indicate areas of potential errors. At step 206, in response to the displayed initial path, the user can provide inputs to adjust the initial path to eliminate these potential errors or otherwise fine tune the initial path. The adjustment inputs can be received by the adjustment module 116 via the user interface 110, such as graphically in the same three-dimensional virtual environment in which the initial path is displayed. If not adjustment inputs are received, the process 200 is configured to execute step 212 by directing the implementation module 118 to operate the robot 115 substantially along the initial path.

If adjustment inputs are received at step 206, the adjustment module 116 is adapted to adjust the initial path at step 208, thereby generating a refined path based on the user inputs. The adjustment module 116 is also configured to interact with the user interface 110 to graphically illustrate the refined path, such as in the same virtual environment where the initial path was illustrated. For example, the graphical user interface 110 can illustrate the movement of the user when adjusting the initial path (e.g., the user moving a support point or control handle as described in detail below), and provide immediate visual feedback of the adjusted path. In some embodiments, the adjustment module 116 executes the error-checking process 500 of FIG. 5 with respect to the refined path to visually illustrate one or more errors (e.g., singularity, collision and/or out-of-reach errors) associated with the refined path. Such a display encourages the user to further refine the path to correct or otherwise optimize the path. Further, in some embodiments, the adjustment module 116, in cooperation with the user interface 110, is configured to illustrate the orientation of the TCP of the robot 115 along a refined path to visually demonstrate how the TCP of the robot 115 can follow the path. The orientation of the TCP of the robot 115 can be determined by interpolating the orientations of the TCP between two consecutive support points. In some embodiments, when the path includes one or more support points in the middle of the path, the orientation of the TCP of the robot 115 at that support point is adjustable by the user.

In some embodiments, the inputs for adjusting the initial path received at step 206 comprise data that specifies at least one support point along the initial path and data for moving the support point to a different location in the three-dimensional space. In response, the adjustment module 116 at step 208 is adapted to alter the initial path such that a refined path is generated to interpolate the relocated support point between the start and end points of the initial path.

Figure 8:
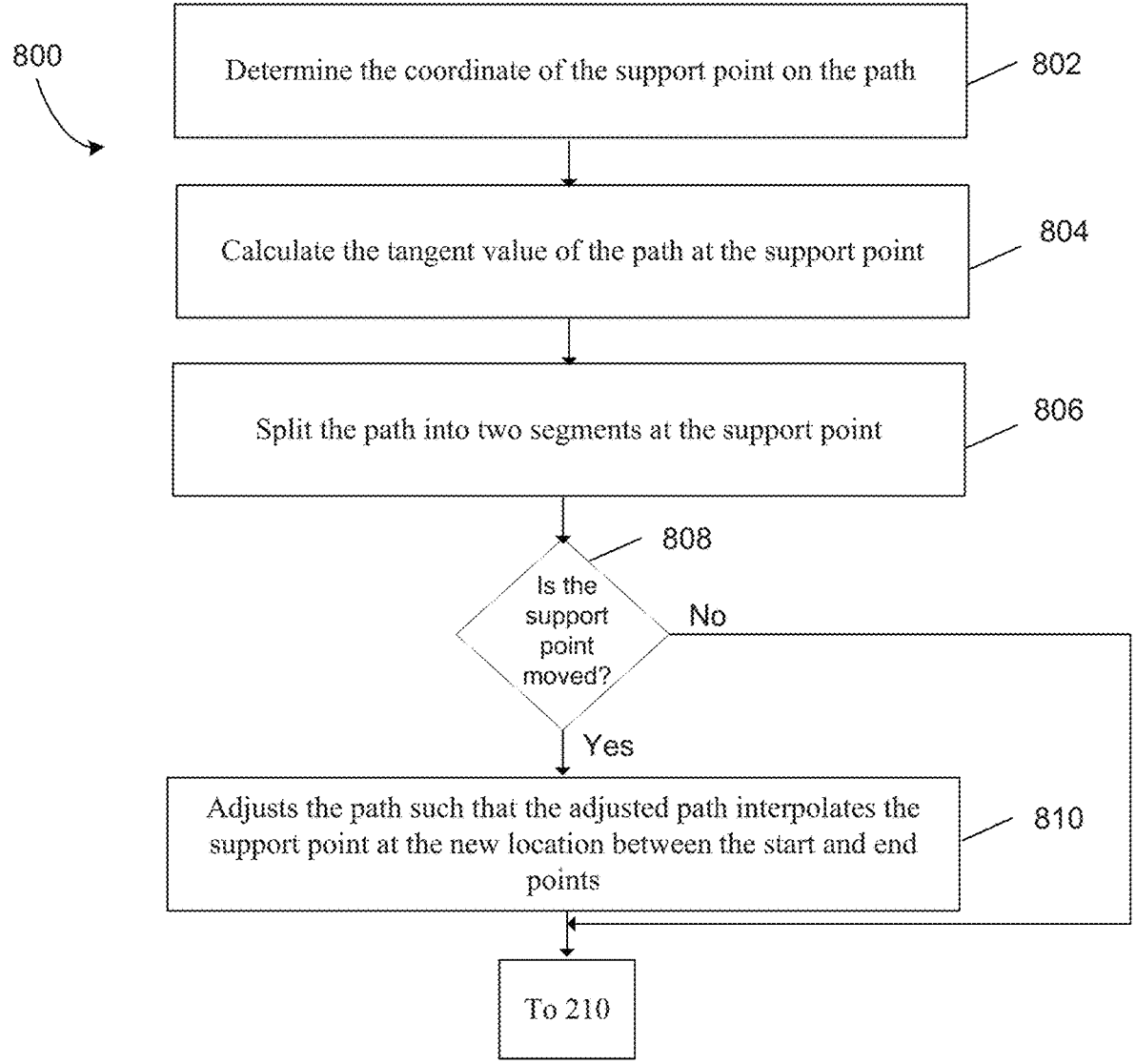
FIG. 8 is an exemplary approach for creating a refined path to incorporate a support point at a user-specified location, according to an illustrative embodiment of the present invention.

FIG. 8 is an exemplary approach 800 for generating a refined path to incorporate a support point at a user-specified location, according to an illustrative embodiment of the present invention. At step 802, the adjustment module 116 determines the coordinate of the user-specified support point, where the support point is on the initial path prior to the user moving it for the purpose of altering the initial path. For example, as shown in FIG. 4, the user can specify a support point 412 on the initial path 400. This support point is movable by the user, thereby allowing the user to adjust the path. In some embodiments, the support point is associated with a control handle 413, which allows the user to adjust the tangent and/or curvature of the adjacent segments connected to the support point 412. The control handle 413 shared by the two adjacent segments assures that refinement to the initial path 400 preserves certain continuity conditions for the path, such as G2 (position and tangent) continuity of the path. Generally, the term "support point" refers to the meeting point of two segments (e.g., Bezier curves) in a path (e.g, a Bezier spline curve). Two neighboring segments on a path share a single support point and corresponding control handle.

At step 804, the adjustment module 116 calculates one or more parameters associate with the support point, such as the tangent value of the initial path at the support point. At step 806, the adjustment module 116 splits the initial path into two segments at the support point, where each segment is modeled by a new polynomial function. Specifically, a first segment has (i) the same start point and the same tangent at the start point as the initial path and (ii) an end point that is the support point and the tangent at the end point is the same as the tangent of the initial path at the support point. A second segment has (i) a start point that is the support point and the tangent at the start point is the same as the tangent of the initial path at the support point and (ii) the same end point and the same tangent at the end point as the initial path.

At step 808, the adjustment module 116 detects whether the user has dragged/moved the support point on the initial path to a new location. If that is the case, at step 810, the adjustment module 116 adjusts the initial path such that the refined path interpolates the support point at the new location between the start and end points of the initial path. This means that the two polynomial functions generated from step 806 are suitably modified so that the endpoint of the first segment and the start point of the second segment are both at the new support point location. However, if the support point is not moved to a new location, the adjustment module 116 takes no further action for adjusting the path and control reverts back to step 210 of FIG. 2. Thus, when a new support point is added, the original polynomial function corresponding to the section of the path on which the new support point is located is replaced with two new polynomial functions to represent the splitting of the path section, and the two polynomial functions can be modified to reflect any movement of the support point to alter the path.

In some embodiments, the two segments corresponding to the new support point in the refined path are Bezier spline functions. These neighboring Bezier spline functions are constrained to have a G2 (position and tangent) continuity in the spline. To ensure that the curve of the refined path is G1 (position-wise) continuous, the segments of the refined path are connected by the support points. To ensure that the curve of the refined path is G2 (tangent-wise) continuous, the control handles of the neighboring segments at the point of connection (i.e., the shared support point) have the same slope.

Referring back to the path-generation approach 200 of FIG. 2, at steps 206 and 208, another path adjustment involves the user changing the curvature and/or tangent of one or more sections of a path. This can be accomplished by the user adjusting (e.g., moving) a control handle associated with each support point as well as associated with each of the start and end points. In some embodiments, the start and end points are treated as specialized support points that are fixed in space (i.e. not movable by a user). By moving a control handle of a support point, a control handle of a start point or a control handle of an end point, the user can alter the curvature and/or tangent of at least a portion of a path, such as neighboring segment(s) connected to the support point. Adjusting a control handle of a support point is adapted to modify the corresponding polynomial function used to model the section of the path being adjusted (e.g., the section of the path connected between the corresponding support point for which the control handle is adjusted and an adjacent support point) so as to reflect the change in curvature/tangent to the path section. This typically does not necessitate adding a new polynomial function to the set of functions used to represent the processing path.

At step 210, the user can iteratively adjust the refined path by specifying additional adjustments at each iteration. During each iteration, the refined path can be graphically displayed to the user via the user interface 110 to encourage further fine tuning from the user until a desired path is created. For example, the refined path created at each adjustment iteration can be evaluated for certain errors (e.g., singularity, collision and/or out-of-reach errors) using the error-checking routine 500 of FIG. 5 and the errors can be color-coded relative to the refined path to provide visual feedback to the user for the purpose of facilitating further adjustment. As described above, the adjustment at each iteration can involve one of (i) adding a support point on the path from the previous iteration and changing the location of the support point, (ii) deleting a support point, (iii) adjusting a control handle associated with one of the support point(s), start point or endpoint of the path from the previous iteration, and/or (iv) changing one or more of the tessellation parameters.

In some embodiments, the initial path is represented by a single curve between a start point and an endpoint, where the curve is modeled by a single three-dimensional polynomial function. At the subsequent iterations, an additional three-dimensional polynomial function is added to the function set for each additional support point specified between the start and end points, where each of the polynomial functions in the function set represents a path segment between two support points. Thus, if a refined path includes one or more support points, the path is represented by multiple segments connected in series by the start point, the support point(s), and the endpoint. In some embodiments, manipulating a control handle does not involve adding or deleting a function relative to the function set, but requires modification of at least one of the existing functions in the function set.

Figure 9A:
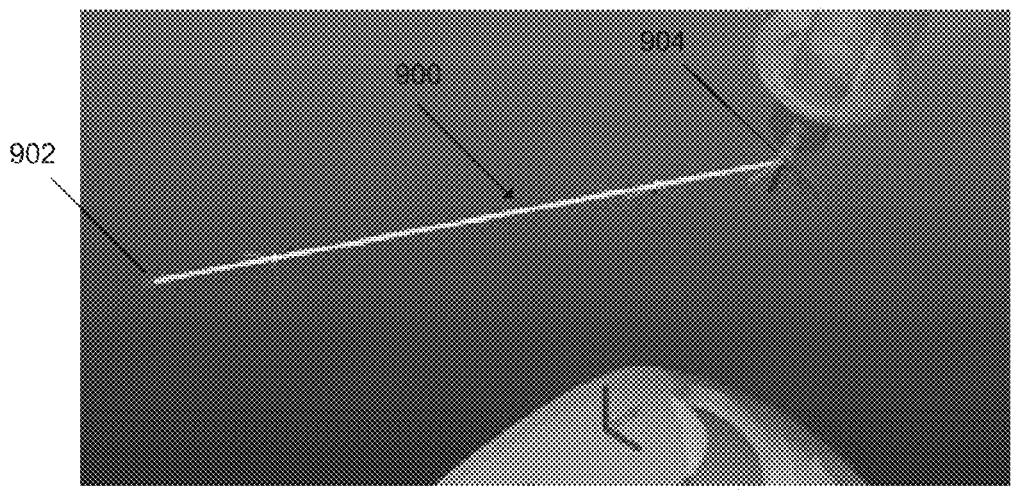
FIGS. 9a-9g is a set of exemplary paths depicting various adjustments a user can make to the paths, according to some illustrative embodiments of the present invention.
Figure 9B:
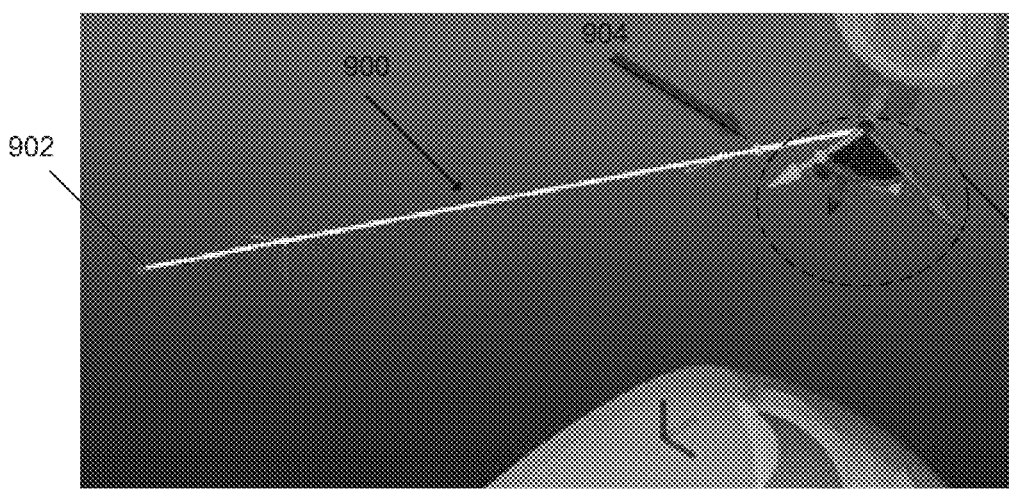
Figure 9C:
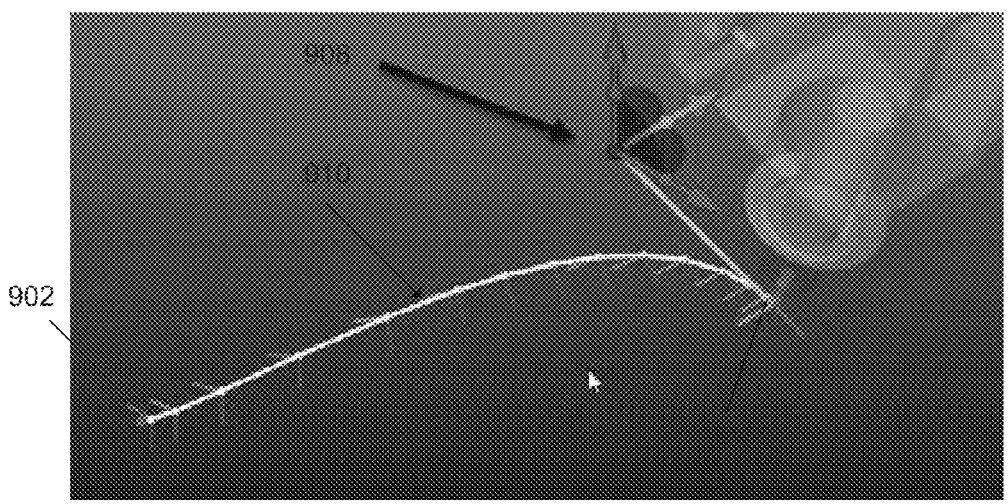

FIGS. 9a-9g is a set of exemplary paths depicting various adjustments a user can make to the paths, according to some illustrative embodiments of the present invention. FIG. 9a shows an initial path 900 that can be modeled by a single three-dimensional polynomial function, such as a function with the X, Y, Z components of Equations 1-3. The initial path 900 can be a Bezier curve having a user-specified start point 902 and a user-specified endpoint 904. In FIG. 9b, a user can select (e.g., click on) either one of the start point 902 or the end point 904 of the initial path 900, which prompts a control handle 906 associated with the selected point (e.g., the end point 904) to appear. In FIG. 9c, the user can adjust the control handle 906 corresponding to the end point 904, such as rotating or moving the control handle 906, to adjust the curvature and/or tangent of the initial path 900. As shown, the user can drag the control handle 906 in a specific direction 908 in the three-dimensional space, in which case the resulting refined path 910 becomes curved towards that direction 908. In some embodiments, adjusting the control handle 906 modifies the corresponding polynomial function used to model the section of the path being adjusted so as to reflect the change in curvature/tangent, but does not add a new polynomial function to the set of functions used to represent the path 910. Thus, the refine path 910 can still be represented by a single three-dimensional polynomial function, but modified to reflect the changed curvature/tangent.

Figure 9D:
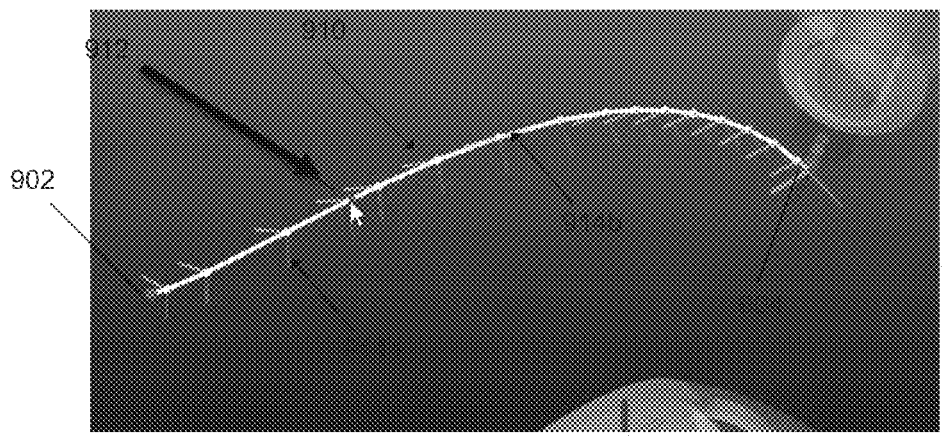
Figure 9E:
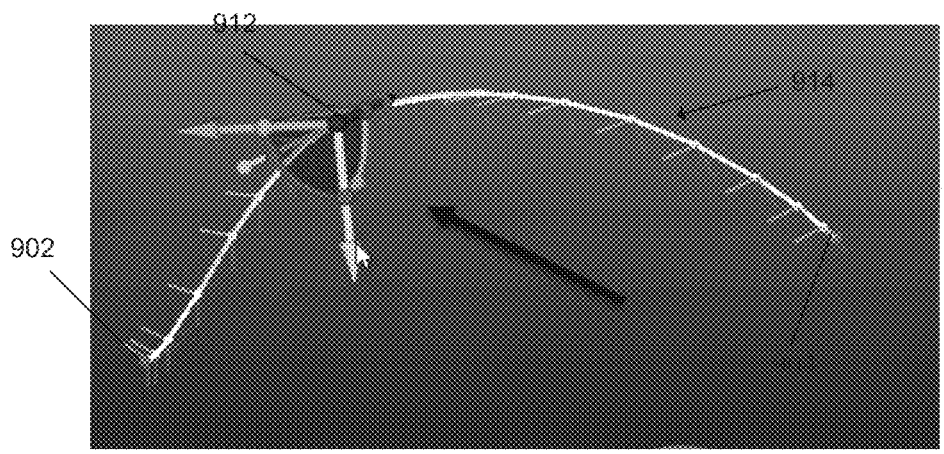
Figure 9F:
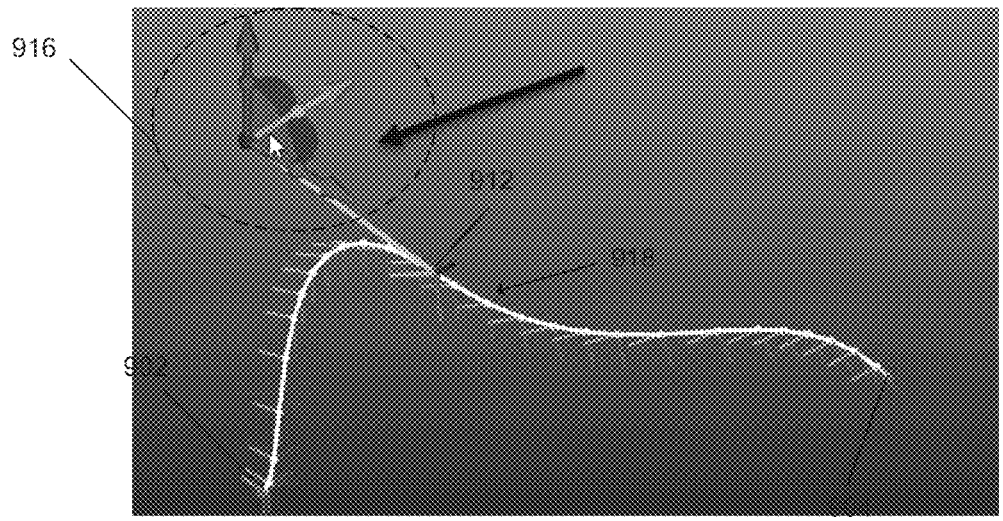
Figure 9G:

Furthermore, as shown in FIG. 9d, the user can further adjust the refined path 910 by introducing a support point 912 on the path 910 between the start point 902 and the endpoint 904, which are both fixed. For example, the user can introduce the support point 912 by double clicking on a location of the path 910 between the start and end point 902, 904. Once the support point 912 appears, the path 910 is split into two segments 914a, 914b and the original polynomial function used to represent the path 910 is replaced with two new polynomial functions representing the two segments 914a, 914b. As shown, segment 914a extends from the start point 902 to the support point 912 and segment 914b extends from the support point 912 to the endpoint 904. As shown in FIG. 9e, the user can move the support point 912 to modify the path 910 such that the resulting path 914 interpolates the relocated support point 912 between the start and end point 902, 904. In some embodiments, this adjustment triggers modification of the two polynomial functions representing the segments 914a, 914b such that these segments are connected at the relocated support point 912 and satisfy certain continuity constraints. As shown in FIG. 9f, the resulting refined path 914 can be further modified by the user by adjusting the control handle 916 associated with the support 912, which changes the curvature of the path 914 to generate a further refined path 918. Other modifications include adding one or more support points (not shown) and/or removing one or more support points. For example, as shown in FIG. 9g, the user can remove the support point 912 by right clicking on the support point 912, in which case the support point is deleted and the path 918 is returned to a state where only one polynomial function is used to represent the path 918 since there is no support point between the start and end points 902, 904.

Figure 10A:
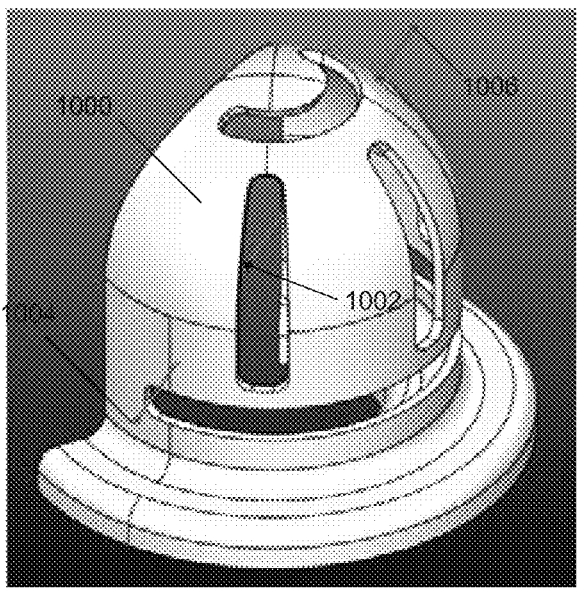
FIGS. 10a-10e is another set of exemplary paths depicting various adjustments a user can make to the paths, according to some illustrative embodiments of the present invention.
Figure 10B:
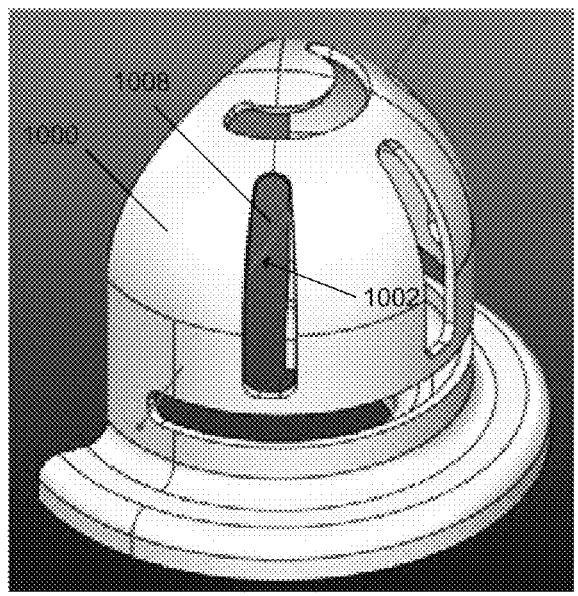
Figure 10C:
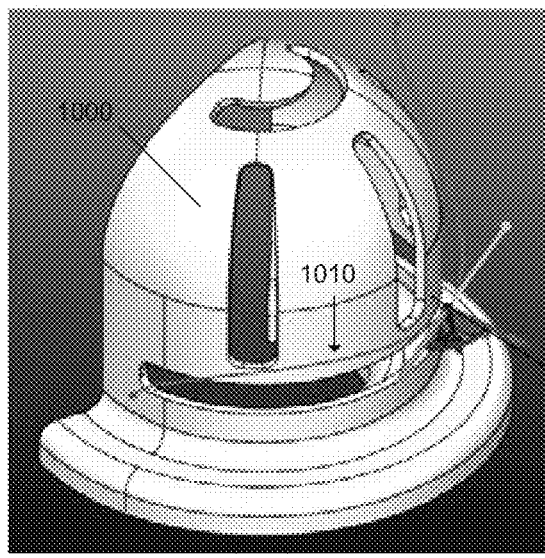
Figure 10D:
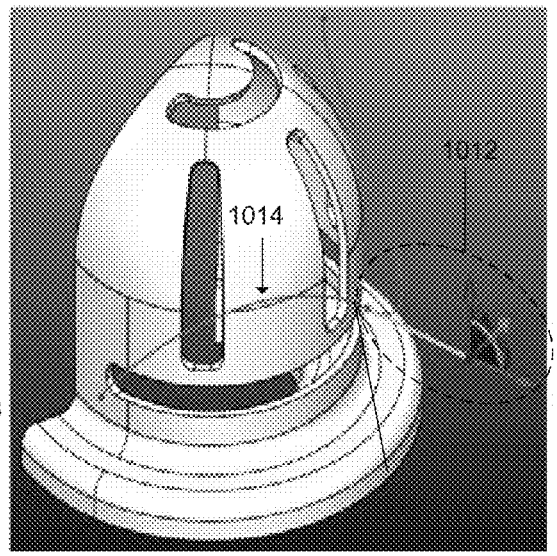
Figure 10E:
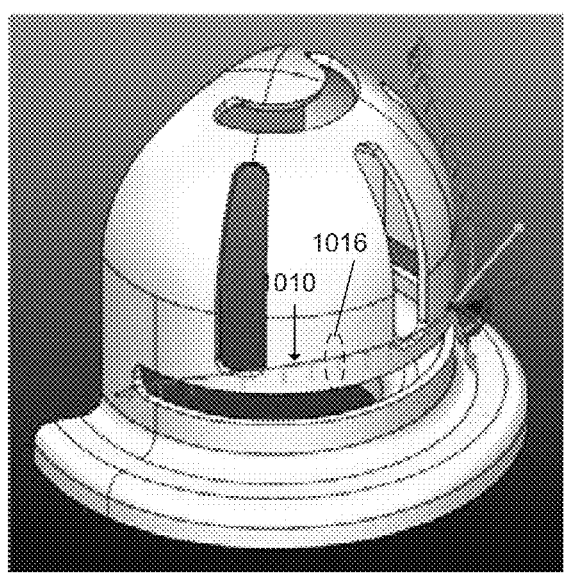

FIGS. 10a-10e is another set of exemplary paths depicting various adjustments a user can make to the paths relative to a workpiece 1000, according to some illustrative embodiments of the present invention. FIG. 10a shows an exemplary initial path 1002 connected by a straight Bezier curve between a start point 1004 and an end point 1006. FIG. 10b shows a support point 1008 being added by a user at a desired position along the initial path 1002. FIG. 10c shows the support point 1008 being moved by a user to a different location in space. In response, the adjustment module 116 is configured to modify the initial path 1002 to generate a refined path 1010 such that the refined path 1010 includes the relocated support point 1008. FIG. 10d shows the control hand 1012 of the support point 1008 being adjusted by the user. In response, the adjustment module 116 is configured to modify the refined path 1010 to generate another refined path 1014 such that it includes an adjusted curvature corresponding to the modified control handle 1012. FIG. 10e shows one or more tessellated points 1016 on the refined path 1010, which can be used to detect errors associated with the path 1010 as described above. Each support point on the initial path or the refined path holds information for the position and orientation of the TCP of the robot 115. This means that when the TCP of the robot 115 is passing that support point, the TCP will have that corresponding position and orientation. To have a path with complete information, each tessellated point on the path should also hold the information of the position and orientation of the TCP of the robot 115. The position interpolation of the tessellation points depends on the tessellation parameters described above (e.g., distance, chordal deviation and angle parameters). When the position of the tessellated points is defined, the orientation of the tessellated points is added based on the length of the curve between two consecutive points over the total length of the curve between two consecutive support points multiplied by the orientation change required to move from the orientation of the first support point of that curve to the orientation of the next support point plus the orientation of the first tessellated point of the two consecutive tessellated points. The orientation of the added support points (i.e. not the start support point and end support point) can be adjusted by the user. Adjustments to the support point orientation changes the orientation of the tessellated points on the curve segments before and after the support point.

Figure 11:
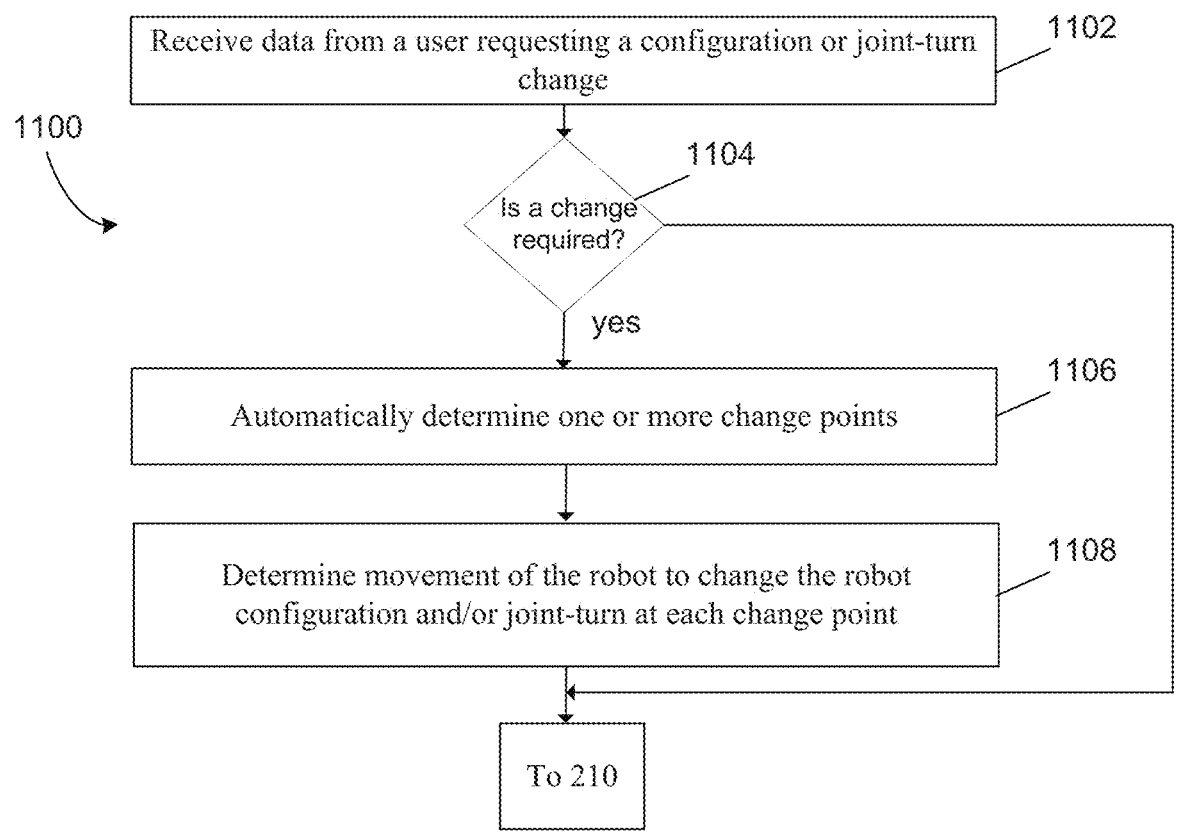
FIG. 11 is an exemplary approach for changing a configuration or turning a joint of the robot of FIG. 1, according to an illustrative embodiment of the present invention.

Referring back to the path-generation approach 200 of FIG. 2, in some embodiments, at each adjustment iteration represented by steps 208 and 210, the process 200 also includes the optional step 214 of generating a change path for reconfiguring the robot 115 or turning a joint of the robot 115 based on user input. FIG. 11 is an exemplary approach 1100 for changing the configuration or turning a joint of the robot 115 of FIG. 1, according to an illustrative embodiment of the present invention.

As shown, at step 1102, data is received from a user, such as via the user interface 110, to specify a robot configuration change or a joint-turn change. Data related to a configuration change includes a start configuration of the robot 115 at the start point of the path (i.e., the robot's TCP path) and/or an end configuration of the robot 115 at the end point of the path, where the start and end configurations are different from each other. Data related to a joint turn change includes a start coordinate of a particular joint of the robot 115 at the start point of the path (i.e., the robot's TCP path) and/or an end coordinate of the joint at the endpoint of the path, where the start and end coordinates of the joint are in different turns from each other. At step 1104, the determination module 114 determines whether a configuration change or a joint-turn change is required for the robot 115 based on the user input. A configuration change involves detecting a difference between the start configuration and the end configuration of the robot 115. A joint-turn change involves detecting a change between the start coordinate and the end coordinate for the joint of the robot 115.

If a change is detected, the determination module 114 automatically generates a change path at steps 1106 and 1108. In the case of a configuration change, the change path specifies a path for moving one or more joints of the robot 115 to accomplish the change from the start to end configuration. In the case of a joint-turn change, the change path specifies a route for moving the user-specified joint of the robot 115 to accomplish the joint turn from the start joint coordinate to the end joint coordinate. Specifically, for generating the change path in relation to the configuration change, the determination module 114 at step 1106 automatically determines one or more change points that are reachable by the robot 115 in either the start or end configuration. Then, at step 1108, the determination module 114 determines a set of joint movements required to change the configuration at the change point. The resulting change path thus includes the start configuration of the robot 115 corresponding to the start point of the path, the path on which the TCP of the robot 115 moves during configuration change, and the end configuration of the robot 115 corresponding to the end point of the path. For generating the change path in relation to the joint-turn change, the determination module 114 at step 1106 automatically determines one or more change points that are reachable by the robot 115 in either the start joint coordinate or the end joint coordinate. Then, at step 1108, the determination module 114 determines a movement of the specific joint required to reach that change point. The resulting change path thus includes the start joint coordinate corresponding to the start point of the path, the path on which the TCP of the robot 115 moves during joint turn change, and the end joint coordinate correspond to the end point of the path. Control reverts back to step 210 of the process 200 at the conclusion of the change path routine 1100.

In some embodiments, the change path for moving the robot 115 that implements either a configuration change or a joint-turn change is substantially independent of the refined path for moving the tool center point (TCP) of the robot 115 and does not interfere with the refined path. In some embodiments, the determination module 114 generates the change path to be substantially error free, such as free of collision. In some embodiments, the change path is user adjustable such that a user can fine tune the path to implement the configuration change or the joint-turn change desired. In some embodiments, the determination module 114, in cooperation with the user interface 110, is configured to display within a virtual space a change path for changing the configuration of the robot 115 or turning a joint of the robot 115.

Figure 12:
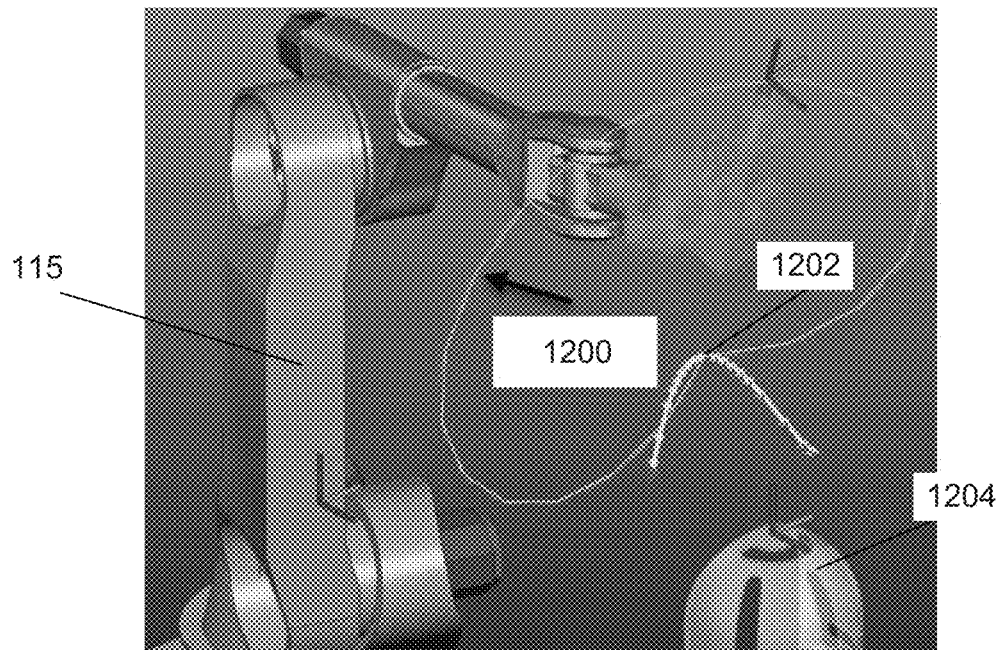
FIG. 12 is an exemplary change path for changing the configuration of the robot of FIG. 1 from a start configuration to an end configuration, according to an illustrative embodiment of the present invention.

FIG. 12 is an exemplary change path 1200 for changing the configuration of the robot 115 of FIG. 1 from a start configuration to an end configuration, according to an illustrative embodiment of the present invention. The robot 115 can assume a start configuration at the change point 1202 and change its configuration along the change path 1200 such that it ends with an end configuration again at the change point 1202. The robots 115 can then continue on a refined path 1204 with the new end configuration to, for example, process the workpiece 1204. Generally, the configuration change or joint-turn change of the robot 115 can occur before or after the robot 115 moves to follow a refined path in relation to its TCP.

Referring back to the path-generation approach 200 of FIG. 2, at step 212, once the user if satisfied with the planned path, the implementation module 118 is configured to direct the robot 115 such that the TCP of the robot 115 follows the refined path generated. The implementation module 118 can directly interact with the robot 115 to guide the robot 115. Alternatively, the implementation module 118 can interact with the robot 115 indirectly via one or more intermediate computing modules, where the implementation module 118 and the intermediate module(s) can be in the same robotic system 100. In some embodiments, the planned path generated by the process 200 can be used to guide the robot 115 to enable a tool (e.g., a plasma arc torch) mounted to the end effector of the torch to cut a workpiece substantially along the path, such as the setup shown the processing environment of FIG. 4. In some embodiments, the implementation module 118 can also change the configuration of the robot 115 or turn a joint of the robot 115 based on a change path generated by the process 200. In some embodiments, the robot 115 is guided along the refined path and/or the change path to perform at least one of trimming, cutting (e.g., using laser, water-jet or plasma), 3D machining, de-burring, welding, dispensing, surfacing (e.g., polishing, sanding, or grinding), spraying (e.g., thermal projection, cold spray, coating, or painting) or additive applications (e.g., 3D printing or material build-up).

In some embodiments, the path planning process can be fully automated without user adjustment. In such a case, the user only needs to specify the start point and the end point of the path. The processor 105 is able to automatically determine a recommended path by learning from historical user adjustments. Thus, the recommended path by the processor 105 is able to capture patterns in user preference.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A computer-implemented method for guiding a robot in a robotic system, by creating a refined path, based on an initial path in a three-dimensional space, the method comprising:
   receiving, by a computing device, data related to creating the initial path, including a start point and an endpoint;
   generating, by the computing device, the initial path by interpolating the start point and the endpoint, wherein generating the initial path comprises:
      determining, by the computing device, a set of one or more polynomial functions to represent the initial path, wherein the set of one or more polynomial functions defines coordinates to model a route from the start point to the end point; and
      displaying, by the computing device on a computerized display, the initial path in a virtual environment;
   receiving, by the computing device, inputs for at least one support point on the initial path that defines a coordinate in the three-dimensional space for altering the initial path;
   causing a control handle to appear on the computerized display for at least one of the start point, the endpoint or the support point, the control handle permitting a user to rotate or move the control handle in the three-dimensional space to change curvature of at least a portion of the initial path or the refined path;
   adjusting, by the computing device, the initial path to generate the refined path by modifying the set of one or more polynomial functions, such that the refined path interpolates the at least one support point between the start point and the endpoint; and
   providing, by the computing device, the refined path to a second computing module for guiding the robot.

2. The computer implemented method of claim 1, wherein at least one of the start point, the endpoint or the support point is user specifiable.

3. The computer implemented method of claim 2, wherein adjusting the initial path comprises:
   receiving user input specifying a location of the support point in three dimensional space;
   adding at least one new polynomial function to the set of one or more polynomial functions, such that the refined path includes the user specified support point, the start point and the endpoint; and
   displaying the refined path on the graphical user interface.

4. The computer implemented method of claim 1, further comprising:

receiving user input to manipulate the control handle associated with at least one of the start point, the endpoint or the support point,
   modifying the set of one or more polynomial functions, such that at least a portion of the refined path has a modified curvature corresponding to the manipulated control handle; and
   displaying the refined path on the graphical user interface.

5. The computer implemented method of claim 4, wherein the at least portion of the refined path with the modified curvature comprises a path portion between the corresponding point for which the control handle is adjusted and an adjacent point.

6. The computer implemented method of claim 1, wherein the refined path comprises a plurality of segments connected in series by the start point, the at least one support point, and the endpoint, wherein each segment is modeled by one polynomial function in the set of one or more polynomial functions.

7. The computer implemented method of claim 6, further comprising adding at least one new polynomial function to the set of one or more polynomial functions when a new support point is added.

8. The computer implemented method of claim 1, wherein the set of one or more polynomial functions comprises at least one Bezier spline function.

9. The computer implemented method of claim 1, further comprising:
   detecting a potential error associated with at least one of the initial path or the refined path; and
   color coding at least a portion of the corresponding initial or refined path to visually indicate the potential error, the color-coded portion of the corresponding path correlates to an area at which the potential error is likely to occur.

10. The computer implemented method of claim 9, wherein the potential error comprises the color-coded portion of the corresponding path being out of reach of the robot.

11. The computer implemented method of claim 9, wherein the potential error comprises the color-coded portion of the corresponding path causing the robot to be in a singularity configuration.

12. The computer implemented method of claim 9, wherein the potential error comprises the robot colliding with an object in the robotic system if the robot attempts to reach the color-coded portion of the corresponding path.

13. The computer implemented method of claim 9, further comprising:
   tessellating at least one of the initial path or the refined path to generate a plurality of tessellated points along the corresponding initial or refined path; and
   checking at each of the tessellated points along the corresponding path for the potential error.

14. The computer implemented method of claim 1, further comprising operating the robot to enable a tool mounted thereon to cut a workpiece substantially along the refined path, wherein the tool comprises a cutting tool for cutting the workpiece.

15. The computer implemented method of claim 1, further comprising:
   learning, by the computing device, user adjustments to the initial path to determine a pattern in the adjustments; and
   automatically generating, by the computing device, a recommended path based on the learning.

16. The computer implemented method of claim 1, further comprising:
receiving, by the computing device, inputs specifying a start configuration and an end configuration for moving one or more joints of the robot;
automatically determining, by the computing device, a difference between the start and end configurations;
adding a change path for moving the robotic joints from the start configuration to the end configuration based on the difference, wherein the change path for moving the robotic joints avoids interfering with the refined path.

17. The computer implemented method of claim 16, wherein automatically determining the change path comprises automatically locating, by the computing device, a change point between the start configuration and the end configuration, wherein the change path is adapted to include the start configuration, the change point, and the end configuration.

18. The computer implemented method of claim 16, wherein the change path is substantially collision free.

19. The computer implemented method of claim 1, further comprising:
displaying the refined path on the graphical user interface; and
allowing a user to iteratively adjust the refined path via the graphical user interface by manipulating a location of the at least one support point or a control handle of the at least one support point.

20. The computer implemented method of claim 1, wherein the computing device and the second computing module are in the same robotic system.

21. A non-transitory computer readable storage medium having stored thereon a computer program product for guiding a robot in a robotic system to move between a given start point and a given endpoint, by designing a refined path based on an initial path in a three-dimensional space, the computer program product including computer-executable instructions adapted to be executed on a computing device to implement a method comprising:
receive data related to creating the initial path, including the start point and the endpoint;
generate the initial path by interpolating the start point and the endpoint, wherein instructions operable to cause the computing device to generate the initial path comprises instructions operable to cause the computing device to:
determine a set of one or more polynomial functions to represent the initial path, wherein the set of one or more polynomial functions define coordinates to model a route from the start point to the end point; and
display the initial path on a computerized display;
receive inputs for at least one support point on the initial path that defines a coordinate in the three-dimensional space for altering the initial path;
cause a control handle to appear on the computerized display for at least one of the start point, the endpoint or the support point, the control handle permitting a user to rotate or move the control handle in the three-dimensional space to change curvature of at least a portion of the initial path or the refined path;
adjust the initial path to generate the refined path by modifying the set of one or more polynomial functions, such that the refined path interpolates the at least one support point between the start point and the endpoint; and
provide the refined path an operating module for guiding the robot from the start point to the endpoint.

22. The computer readable product of claim 21, wherein the computer readable product includes instructions operable to further cause the computing device to provide the refined path to enable the robot and a tool mounted on the robot to move substantially along the refined path to process a workpiece.

23. The computer readable product of claim 22, wherein the tool comprises a cutting tool for cutting the workpiece.

24. A computer-implemented robotic system of a manufacturing processing system for guiding a robotic means in a three-dimensional space, the computer-implemented robotic system comprising:
an input means for (i) receiving data related to creating an initial path, including a start point, an endpoint, and (ii) inputs for at least one support point that defines a coordinate in the three-dimensional space for altering the initial path;
a determination means for generating the initial path by interpolating the start point and the endpoint, the determination means comprises:
a modeling means for determining a set of one or more polynomial functions to represent the initial path, wherein the set of one or more polynomial functions define coordinates to model a route from the start point to the end point; and
a display means for causing to display on a computerized display the initial path in a virtual environment;
a prompting means for causing a control handle to appear on the computerized display for at least one of the start point, the endpoint or the support point, the control handle permitting a user to rotate or move the control handle in the three-dimensional space to change curvature of at least a portion of the initial path or the refined path;
an adjusting means for adjusting the initial path to generate a refined path by modifying the set of one or more polynomial functions, such that the refined path interpolates the at least one support point between the start point and the endpoint; and
an output means for providing the refined path to a second computing module for guiding the robotic means from the start point to the endpoint.

25. The computer-implemented robotic system of claim 24, further comprising an enabling means for causing the robot and a tool mounted on the robot to move substantially along the refined processing path to process a workpiece.

26. The computer-implemented robotic system of claim 25, wherein the tool comprises a cutting tool for cutting the workpiece.

27. A computer-implemented method for guiding a robot having a tool mounted thereon for processing a workpiece, by creating a refined path based on an initial path in a three-dimensional space, the method comprising:
receiving, by a computing device, data related to creating the initial path, including a start point and an endpoint;
generating, by the computing device, the initial path by interpolating the start point and the endpoint, wherein generating the initial path comprises:
determining, by the computing device, a set of one or more polynomial functions to represent the initial path, wherein the set of one or more polynomial functions defines coordinates to model a route from the start point to the end point;
detecting, by the computing device, a potential error associated with the initial path; and displaying, by the computing device on a computerized display, the initial path in a virtual environment, wherein at least one section of the initial path is configured to visually indicate the potential error;

receiving, by the computing device, data for at least one support point on the initial path that defines a coordinate in the three-dimensional space for altering the initial path;

causing a control handle to appear on the computerized display for at least one of the start point, the endpoint or the support point, the control handle permitting a user to rotate or move the control handle in the three-dimensional space to change curvature of at least a portion of the initial path or the refined path;

adjusting, by the computing device, the initial path to generate the refined path by modifying the set of one or more polynomial functions, such that the refined path interpolates the at least one support point between the start point and the endpoint; and providing, by the computing device, the refined path to enable the robot and the tool to move substantially along the refined processing path to process the workpiece.

28. The computer implemented method of claim 27, further comprising:
(i) detecting a potential error associated with the refined path;
(ii) displaying, on the graphical user interface, the refined path, wherein at least one section of the refined path is color coded to visually indicate the potential error associated therewith;
(iii) receiving inputs for at least one modification of the refined path;
(iv) adjusting the refined path by modifying the set of one or more polynomial functions to model the modification to the refined path; and
(v) repeating steps (i)-(iv) until no additional path modification is received.

29. The computer implemented method of claim 28, wherein the potential error comprises the color-coded portion of the corresponding path being out of reach of the robot.

30. The computer implemented method of claim 28, wherein the potential error comprises the color-coded portion of the corresponding path causing the robot to be in a singularity configuration.

31. The computer implemented method of claim 28, wherein the potential error comprises the robot colliding with an object in the robotic system if the robot attempts to reach the color-coded portion of the corresponding path.

32. The computer implemented method of claim 28, wherein adjusting the refined path comprises adding a new polynomial function to the set of one or more polynomial functions in response to receiving inputs to add a new support point between the start and end points.

33. The computer implemented method of claim 28, wherein adjusting the refined path comprises modifying the set of one or more polynomial functions, such that at least a portion of the refined path has a modified curvature in response to receiving inputs to manipulate a control handle associated with at least one of the start point, the endpoint or the support point.

34. The computer implemented method of claim 27, further comprising:
receiving, by the computing device, inputs specifying a start configuration and an end configuration for moving one or more joints of the robot;
automatically determining, by the computing device, a difference between the start and end configurations;
adding a change path to the refined path for moving the robotic joints from the start configuration to the end configuration based on the difference, wherein the change path for moving the robotic joints avoids interfering with the refined path.

35. The computer implemented method of claim 27, wherein the tool comprises a cutting tool for cutting the workpiece.

* * * * *